United States Patent [19]

Bose

[11] Patent Number: 4,713,596

[45] Date of Patent: Dec. 15, 1987

[54] INDUCTION MOTOR DRIVE SYSTEM

[75] Inventor: Bimal K. Bose, Latham, N.Y.

[73] Assignee: General Electric Company, Schenectady, N.Y.

[21] Appl. No.: 753,463

[22] Filed: Jul. 10, 1985

[51] Int. Cl.[4] .......................................... H02P 5/34
[52] U.S. Cl. .................................. 318/802; 318/561; 318/616
[58] Field of Search ............ 189/29 R; 318/802, 561, 318/567, 611, 616, 615, 618, 798–801, 806

[56] References Cited

U.S. PATENT DOCUMENTS

| | | | |
|---|---|---|---|
| 3,863,121 | 1/1975 | Rettig | 318/801 |
| 4,023,083 | 5/1977 | Plunkett | 318/802 |
| 4,075,538 | 2/1978 | Plunkett | 318/72 |
| 4,094,386 | 6/1978 | Suzuki | 187/29 R |
| 4,155,426 | 5/1979 | Booker | 187/29 R |
| 4,491,197 | 1/1985 | Nishiwaki | 187/29 R |
| 4,499,413 | 2/1985 | Izosimov | 318/802 |
| 4,501,344 | 2/1985 | Uherek | 187/29 R |
| 4,503,937 | 3/1985 | Cervenec | 187/29 R |

OTHER PUBLICATIONS

"MOSFET Converter-Fed Position Servo System With Sliding Mode Control", by Harashima et al., Conf. Rec. of Power Electronic Specialists Conference, pp. 73–79, 1983.

"Application of Sliding Modes to the Control of Electrical Drives", by A. Sabanovic, Conf. Rec. of IEEE-IAS Annual Meeting, pp. 553–558, 1982.

"Parameter Adaptation for the Speed Controlled Static AC Drive with Squirrel-Cage Induction Motor", By L. Garces, IEEE-IAS Annual Meeting Conference Record, pp. 843–850, 1979.

"High-Performance Servo Drives for Machine-Tool Applications Using AC Motors", by Kauffman et al., IEEE-IAS Annual Meeting Conference Record, pp. 604–609, 1982.

Primary Examiner—William M. Shoop, Jr.
Assistant Examiner—Patrick C. Keane
Attorney, Agent, or Firm—Marvin Snyder; James C. Davis, Jr.

[57] ABSTRACT

An induction motor is operated under sliding mode control such that the motor shaft position follows a predetermined trajectory. The motor drive's improved insensitivity to load disturbances makes it particularly well adapted to servo applications such as robot and machine tool applications. A sliding mode controller determines the correct torque command which causes the motor shaft position to follow the desired trajectory.

6 Claims, 8 Drawing Figures

INDUCTION MOTOR DRIVE SYSTEM

The present invention relates in general to apparatus and a method for controlling the operation of an induction motor, and more specifically for operating an induction motor under sliding mode control.

BACKGROUND OF THE INVENTION

Presently, 3-phase induction motor drive systems are finding increased use in industry in robot, machine tool and similar type drive applications. Characteristic of such applications are sudden variations in the moment of inertia experienced by the motor shaft, as well as frequent extraneous load disturbances which are transmitted back to the shaft. Such moment of inertia variations and load disturbances, by their lack of predictability, create undesirable motor control problems. The motor's transient response to such disturbances generally results in deviations from the desired motor performance for the particular application. Thus, it is desirable to provide a robust drive system for all such applications, which has predetermined acceleration and deceleration characteristics and which is insensitive to sudden moment of inertia and other parameter variations and to load disturbances of the type that may be encountered in robot and machine tool applications.

One solution known in the art to the problem of overcoming drive system parameter variations and load disturbances is sliding mode control. In general, a motor under sliding mode control is operated in accordance with a predetermined trajectory which is defined on a phase plane coordinate system. In other types of motor control, the response of the control system to a parameter variation is defined in terms of the transfer function for the particular system. The transfer function is derived from the theoretical relationships (or simplified models thereof) which describe motor operation. As a result, parameter variations will directly cause a change in the transfer function and hence in the operation of the motor under control. In sliding mode control, the predetermined trajectory, which is arbitrarily defined by the control system designer, dictates motor operation under the control of the drive system. Since the trajectory is unrelated to any theoretical relationships which describe the operation of the motor, motor operation under sliding mode control is substantially insensitive to parameter variations. A more detailed description of the theory and application of sliding mode control to a variety of systems is found in the text "Control Systems of Variable Structure", by V. Itkis, Wiley, 1976.

In the past, sliding mode control has been used with some success in analog type servo applications. One example of such an application is described in a paper entitled "MOSFET Converter-Fed Position Servo System with Sliding Mode Control" by Harashima, Hashimoto and Kondo, Conference Record of the Power Electronic Specialists Conference, pp. 73–79, 1983. The system disclosed therein is limited in its application to controlling the operation of a DC motor in the sliding mode.

Attempts to apply sliding mode control to AC induction motors have experienced problems in the past. These problems stem primarily from the complexity of the induction motor mathematical model and the corresponding difficulty of applying the sliding mode methodology to that model. "Application of Sliding Modes to the Control of Electrical Drives" by A. Sabanovic, Conference Record IEEE-IAS Annual Meeting, pp. 553–558, 1982. The mathematical model of the three-phase induction machine to which sliding mode control is to be applied is disclosed in that paper as a system of non-linear differential equations of the fifth order. The resulting mathematical model of the sliding mode control scheme for that motor is of such a complexity as to preclude its practical application.

Thus, notwithstanding its desired advantages, the practical and economically feasible application of sliding mode control to the operation of an induction motor has heretofore proved elusive and difficult to implement by those skilled in the art.

OBJECTS OF THE INVENTION

It is a principal object of the present invention to provide new and improved apparatus and method for controlling the operation of an AC induction motor with sliding mode control which is not subject to the aforementioned problems and disadvantages.

Another object of the present invention is to provide a sliding mode control system and method for operating an AC induction motor which is substantially insensitive to parameter variations and to load disturbances.

A further object of the present invention is to provide a sliding mode control system and method for operating an AC induction motor which is sufficiently simple so as to be capable of practical application and economically feasible implementation.

An additional object of the present invention is to provide a sliding mode control system and method of operating an AC inductor motor which is particularly adapted for use in robot and machine tool applications.

SUMMARY OF THE INVENTION

The foregoing objects of the present invention are achieved by means of new and improved control apparatus and method for driving a 3-phase induction motor in a sliding mode, which is substantially insensitive to external load disturbances and parameter variations. The drive control apparatus comprises a sliding mode controller, an inverter driver for controlling the operation of an inverter and means for feeding back to the controller signals representative of motor shaft angular position and velocity. In response to an external shaft position command, the sliding mode controller generates a command signal effective to cause the operation of the induction motor to follow, or "slide" along a predetermined sliding mode trajectory, the latter being established in a phase plane coordinate system. The controller receives feedback input signals representative of the motor shaft speed and position, compares these signals with the trajectory, determines the error deviation from the trajectory and generates a command signal at its output that causes the motor to follow the predetermined trajectory. The command signal is amplified, amplitude limited and applied to an inverter driver. The inverter driver controls the operation of an inverter which, in turn, provides a 3-phase AC output effective to cause the motor to follow the trajectory.

These and other objects of the invention, together with the features and advantages thereof will become apparent from the following detailed specification when read together with the accompanying drawings in which applicable reference designations have been carried forward.

DESCRIPTION OF THE INVENTION

Figure 1:
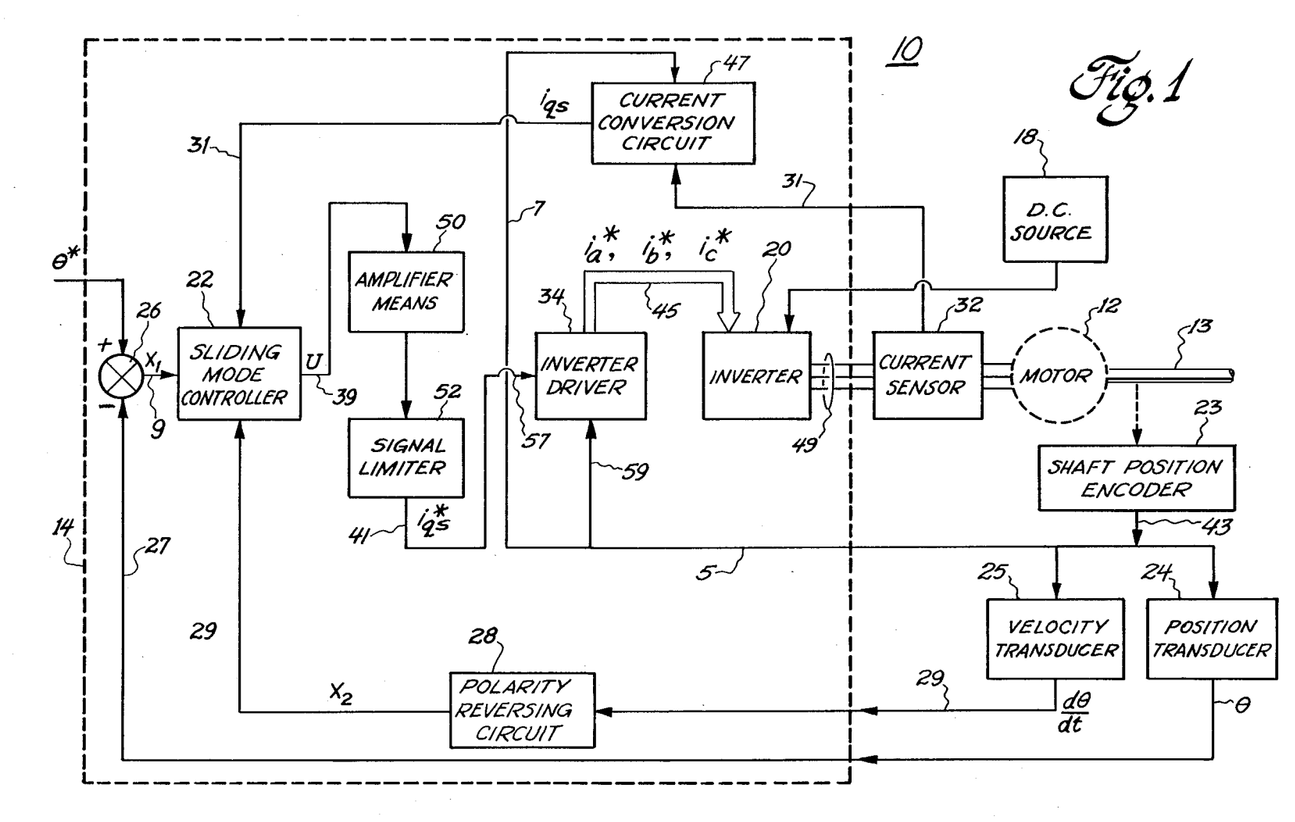
FIG. 1 is a block diagram of the drive control system of the present invention.

With reference now to the drawings, FIG. 1 shows an induction motor drive control system 10. Control system 10 includes a control circuit 14, the 3-phase output of which is coupled to a 3-phase induction motor 12. Control circuit 14 includes a summer 26. A first input of the summer is coupled to receive an external signal representative of a desired motor shaft angular position $\theta^*$. A second input of summer 26 is coupled to the output of a first control loop 27. The output 9 of summer 26 is coupled to a first input of a sliding mode controller 22. A second input of controller 22 is coupled to the output of a second control loop 29 and a third input thereto is coupled to the output of a fourth control loop 31. The output 39 of controller 22 is coupled to an amplifier 50, the output of which is in turn coupled to a signal limiter 52. Output 41 of signal limiter 52 is coupled to a first input 57 of an inverter driver 34. A second input 59 of driver 34 is coupled to a third control loop 5.

Figure 2:
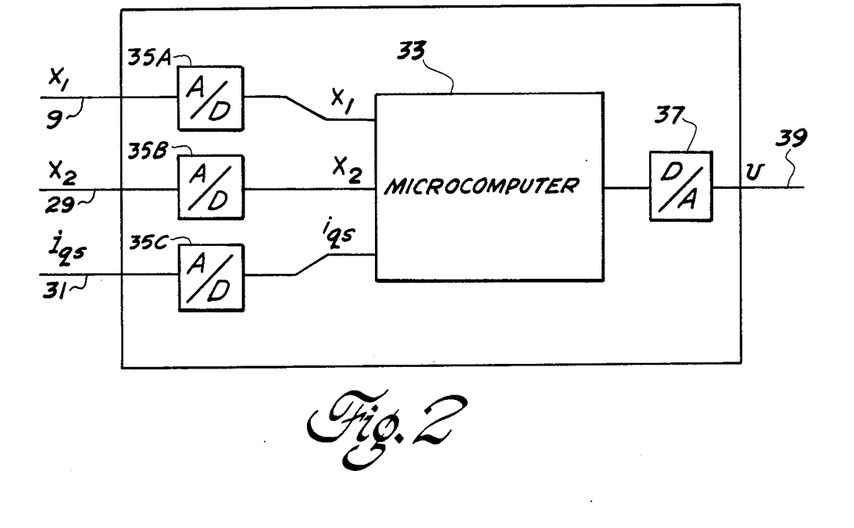
FIG. 2 is a block diagram of the sliding mode controller of the present invention.

Referring to FIG. 2, sliding mode controller 22 is seen to include a microcomputer 33, comprising, for example, an Intel 8751. Analog-to-digital converters 35A, 35B and 35C are each coupled between a controller input and the microcomputer, and a digital-to-analog converter 37 is coupled between the output of the microcomputer and output 39 of the controller.

Figure 3:
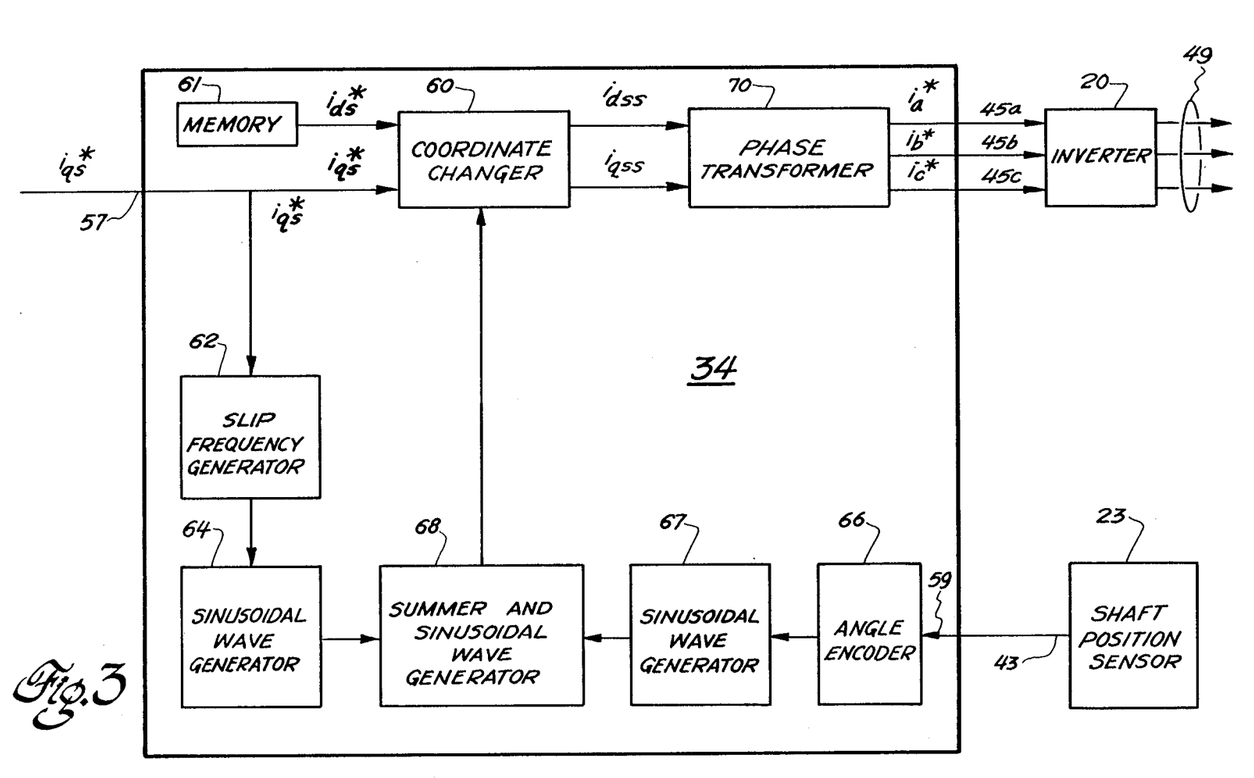
FIG. 3 is a block diagram of a preferred embodiment of the inverter driver.

Referring now to FIG. 3, input 57 of inverter driver 34 for receiving a signal $i^*_{qs}$ has one leg connected to a first input of a coordinate changer 60 and a second leg connected to a slip frequency generator 62. The output of generator 62 is coupled to a sinusoidal wave generator 64. Wave generator 64 is adapted to provide signals on its own output which are applied to a first input of a summer and sinusoidal wave generator 68.

Input 59 of driver 34 is coupled to an angle encoder 66, the output of which is in turn coupled to a sinusoidal wave generator 67. The output signals provided by generator 67 are applied to a second input of wave generator 68. An output of wave generator 68 is coupled to a second input of coordinate changer 60. A memory 61 is adapted to store a preprogrammed signal $i^*_{ds}$ and has its output coupled to another input of changer 60. Changer 60 is adapted to provide a pair of signals $i_{dss}$ and $i_{qss}$ on separate outputs which are applied to a phase transformer 70. Transformer 70 is adapted to provide signals $i^*_a$, $i^*_b$ and $i^*_c$ on outputs 45a, 45b and 45c, respectively, which jointly constitute the signal output of driver 34.

Referring back to FIG. 1, control circuit 14 further includes an inverter 20. Driver output 45 is coupled to the input of inverter 20 which further receives power from a DC source 18. In a preferred embodiment of the invention, DC source 18 may comprise a 3-phase diode rectifier with a capacitor filter, a type of power supply well known in the art.

A current sensor 32, for example a set of current transformers, is coupled to the 3-phase output 49 of inverter 20 and provides a 3-phase signal representative of the motor current. This signal is applied to a first input of a current conversion circuit 47 as part of the aforesaid fourth control loop 31. The output of conversion circuit 47 is coupled to the third input of sliding mode controller 22 to complete the fourth control loop.

Motor 12 includes a motor shaft 13 which is optically coupled to an optical shaft position encoder 23. The output 43 of encoder 23 is connected to input 59 of inverter driver 34 by way of third control loop 5, as well as to conversion circuit 47 by way of a fifth control loop 7. Finally, encoder output 43 is coupled to a position transducer 24 and a shaft velocity transducer 25, the outputs of which are coupled to first and second control loops 27 and 29, respectively. The second control loop further includes a polarity reversing circuit 28 which is connected between velocity transducer 25 and the second input of sliding mode controller 22.

To operate induction motor 12 under sliding mode control, the current applied to the motor is resolved into torque and flux components. The flux component of the current is held at a substantially constant value, while the torque component is varied to control the motor operation. Inverter driver 34 operates motor 12 under indirect vector control, the latter being based on a vector transformation of a motor current control command signal from a synchronously rotating to a stationary reference frame. The theory and the operating details of indirect vector control are set forth in a paper entitled "Parameter Adaption For the Speed Controlled Static AC Drive With Squirrel-Cage Induction Motor" by Luis J. Garces, IEEE/Industrial Applications Society Annual Meeting Conference Record, pp. 843-850, 1979. In the present invention, when indirect vector control is used, the flux component of the current flowing in motor 12, designated $i_{ds}$, is held at a constant predetermined value, preferably corresponding to the motor rated rotor flux. The torque-producing component of the motor current, designated $i_{qs}$, is varied to control the operation of the motor. Consistent with the operation of induction motor 12 under the control of inverter driver 34, the motor rotor flux, $\psi_r$, may be defined as $$\psi_r = K_f i_{ds}$$

where $K_f$ is a constant dependent on the motor design. Additionally, the torque developed across the motor air gap, $T_e$ may be defined as:

$$T_e = K_t \psi_r i_{qs}$$

where $K_t$ is another constant dependent on the motor design. If the expression for the rotor flux is substituted for that of the torque $T_e$, then $$T_e = K_t K_f i_{ds} i_{qs}.$$

With $i_{ds}$ held constant, $$T_e = K_m i_{qs}$$

where constant $K_m = K_t K_f i_{ds}$. Thus, linear control of induction motor 12 is achieved by varying $i_{qs}$ while holding $i_{ds}$ constant.

Figure 4:
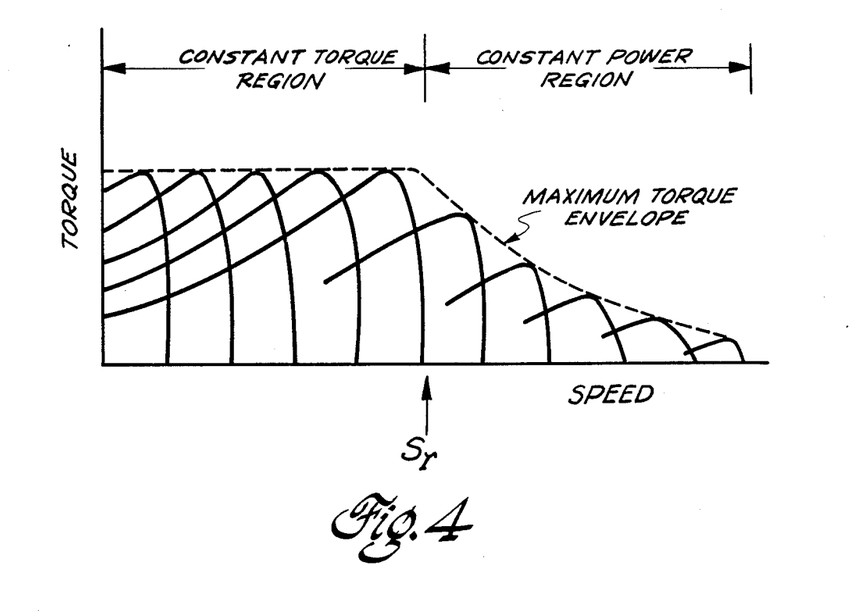
FIG. 4 is an illustrative set of motor speed-torque curves.

FIG. 4 shows a set of torque-speed curves of a typical induction motor. The constant torque region corresponds to one in which the rotor flux is held constant and the motor is operated at speeds at or below the rated speed of the motor, designated as $S_r$. In the preferred embodiment of the present invention, motor 12 is operated in the constant torque region only, with the motor rotor flux maintained at its rated value.

Figure 5:
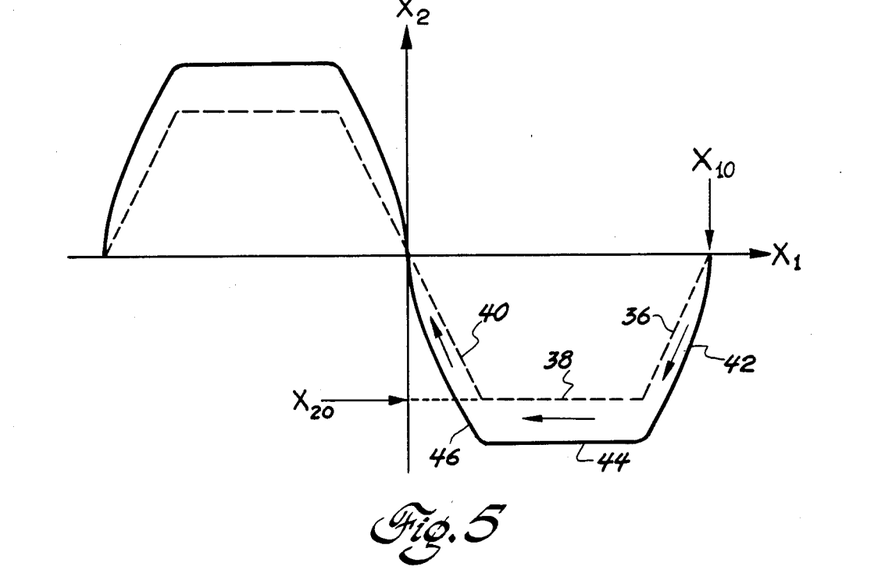
FIG. 5 illustrates an exemplary sliding mode trajectory.

FIG. 5 illustrates an exemplary sliding mode trajectory plotted on the phase plane coordinate system, where the motor shaft position error and the error velocity constitute the abscissa and the ordinate, respectively. The shaft position error of motor 12, designated $X_1$, is defined as the deviation of the actual angular position of shaft 13 from a desired angular shaft position. The error velocity, designated $X_2$, is defined as the first time derivative of position error $X_1$. Portions of the chosen trajectory appear in the second and fourth quadrants of the phase plane, the second quadrant being representative of reverse motion of motor shaft 13 and the fourth quadrant being representative of forward shaft motion. As shown, the trajectory comprises three connected line segments in each trajectory portion. The operating point of the system being controlled in the so-called sliding mode is made to "slide" along each of these segments.

The forward motion portion of the trajectory consists of three straight line segments 36, 38, and 40. Segment 36 represents the operation of motor 12 in an acceleration mode and is described by the equation $$S_1 = -M(X_1 - X_{10}) + X_2$$

where M denotes a predetermined slope of the plotted trajectory segment and $X_{10}$ is the initial position error. Segment 38 represents a constant velocity mode of operation and is described by the equation $$S_2 = X_2 - X_{20}$$

where $X_{20}$ is the desired constant error velocity for motor operation on this segment of the trajectory. Segment 40 represents the deceleration mode of motor operation and is described by the equation $$S_3 = NX_1 + X_2$$

where N denotes a predetermined slope of the plotted trajectory segment.

It will be noted from FIG. 5 that line segments 36, 38 and 40 fall within the area defined by lines 42, 44 and 46. Line 42 represents a maximum limit on the system acceleration rate, characteristic of equipment limitations in inverter 20. Line 46 represents a maximum deceleration rate, likewise characteristic of limitations in inverter 20. Line 44 represents a maximum limit on the system velocity, characteristic of the operating limitations of motor 12. The sliding mode trajectory is selected to be as close as possible to these system operating limits, but within the limits to allow for leeway in setting the actual operating limits.

The appropriate equation for each of line segments 36, 38 and 40 is stored in microcomputer 33 of sliding mode controller 22 (FIG. 2). Further, the microcomputer has stored in its memory the predetermined sliding mode trajectory. From this information and the various signals applied at the inputs of the microcomputer, the latter generates an analog control command signal U effective to cause motor (FIG. 1) to operate along the selected trajectory. More specifically, summer 26 determines the difference between the actual motor shaft angular position, designated $\theta$ and applied to the second summer input, and the externally introduced desired shaft position $\theta^*$ applied to the first summer input. The analog output signal $X_1$ of summer 26 applied to controller 22 is representative of the actual position error of motor shaft 13.

In the preferred embodiment of the invention, shaft position encoder 23 generates a digital signal representative of the actual shaft position. Position transducer 24 converts this digital signal into an analog voltage representative of the actual shaft position $\theta$, which is applied to the second summer input by way of control loop 27.

Velocity transducer 25 converts the digital signal received from position encoder 23 into an analog voltage signal representative of the actual motor shaft angular velocity $d\theta/dt$. The velocity signal $d\theta/dt$ is applied to polarity reversing circuit 28 to provide an error velocity signal $X_2$ representative of the actual shaft error velocity of motor 12. This signal is applied to the second input of controller 22 by way of control loop 29.

In accordance with the operation of summer 26, the shaft position error $X_1$ is defined as $$X_1 = \theta^* - \theta.$$

The shaft error velocity $X_2$ is by definition the first time derivative of position error $X_1$. Thus, $$X_2 = dX_1/dt$$

and hence $$X_2 = d\theta^*/dt - d\theta/dt.$$

In the preferred embodiment of the invention, the desired shaft position error $\theta^*$ is applied to the drive system as a step function. As such $$d\theta^*/dt = 0$$

and hence $$X_2 = -d\theta/dt.$$

Thus, polarity reversing circuit 28 modifies the analog voltage signal representative of shaft angular velocity $d\theta/dt$ by changing its polarity so as to generate the error velocity signal $X_2$. When required, circuit 28 may also modify the amplitude of the applied signal by a factor $K_1$, for example where conversion such as between revolutions per minute and radians per second is desired.

A third analog signal, which is representative of the torque component of the actual motor current $i_{qs}$, is applied to controller 22 by way of fourth control loop 31. Current sensor 32 generates signals representative of the actual 3-phase AC motor current which are resolved by current conversion circuit 47 into torque and flux components. The aforesaid third analog signal is provided on the output of circuit 47 and is representative of the torque component of the actual 3-phase motor current.

Position error signal $X_1$, error velocity signal $X_2$, and motor current signal $i_{qs}$ provide controller 22 with all relevant external operating values required for it to perform its control function. Microcomputer 33 of controller 22, shown in FIG. 2, has stored in its memory an algorithm for performing the sliding mode control function, as well as the motor parameters of the particular drive application. The microcomputer is provided with the signals $X_1$, $X_2$ and $i_{qs}$ through analog-to-digital converters 35A, 35B and 35C within controller 22 and responds by executing the stored control algorithm to calculate the instantaneous amplitude of the command signal. The latter signal is converted into command signal U by digital-to-analog converter 37. In the preferred embodiment of the invention, command signal U appears as an analog DC voltage on the output of controller 22. Signal U is representative of the torque component of the motor current required to maintain the operation of motor 12 (FIG. 1) along the predetermined sliding mode trajectory. The motor operating point on the trajectory is defined in terms of its actual shaft position error and error velocity.

Command signal U is applied to amplifier 50 which has a gain G. The amplified signal is applied to signal limiter 52 which provides a signal $i^*_{qs}$ at its output. Limiter 52 maintains $i^*_{qs}$ within a predetermined amplitude range to assure that the amplitude of the current flowing in the system does not exceed equipment ratings.

The amplitude-limited signal $i^*_{qs}$ is applied to inverter driver 34, which is illustrated in detail in FIG. 3. A fixed value designated $i^*_{ds}$ is recalled from memory 61 of driver 34 and is applied to coordinate changer 60 along with the signal $i^*_{qs}$. Signal $i^*_{ds}$ is representative of a predetermined, fixed value of the flux component of motor current corresponding to the rated rotor flux of motor 12. In slip frequency generator 62, to which the signal $i^*_{qs}$ is also applied, the motor slip frequency is determined from a theoretical relationship relating the slip frequency to $i^*_{qs}$ and to the actual parameters of the motor as defined in the synchronously rotating reference frame. Sinusoidal wave generator 64 provides a set of sine and cosine waves at the slip frequency which are applied to summer and sinusoidal wave generator 68. The frequency of the actual rotation of shaft 13 is derived in angle encoder 66 from the position encoder signal appearing at output 43 of encoder 23. Sinusoidal wave generator 67 provides a set of sine and cosine waves at this rotational frequency (adjusted for the number of winding pole pairs in motor (12) which are applied to wave generator 68. The slip and rotational frequencies are added by wave generator 68, the resulting sum being equal to the required power supply frequency. Sine and cosine waves at this required supply frequency are generated on the output of wave generator 68.

Two waveforms, designated $i^*_{dss}$ and $i^*_{qss}$, respectively, representative of the flux and torque components of motor current in the stationary reference frame, are generated by coordinate changer 60 based on the theoretical relationship between the rotating and stationary reference frames. These waveforms are applied to phase transformer 70 where a 2:3-phase transformation is performed by the known application of the appropriate theoretical relationships. This results in a set of 3-phase analog control signals $i^*_a$, $i^*_b$ and $i^*_c$, which are respectively representative of the currents required to flow in the three phases of induction motor 12, shown in FIG. 2, in order for the motor operation to follow the predetermined sliding mode trajectory. These 3-phase analog control signals are applied to inverter 20 which provides 3-phase currents on output 49 substantially equal to the aforesaid required motor current.

In the preferred embodiment of the invention, inverter 20 comprises a pulse width modulated inverter, e.g. of the type shown in Bose, U.S. Pat. No. 4,409,534, wherein the voltage output of a DC source 18 is applied to power switching devices, such as transistors. These devices are controlled to switch on and off repeatedly during each half-cycle of the fundamental frequency voltage output wave in order to generate an AC output voltage. The 3-phase analog control signals applied to inverter 20 are effective to vary the switching operations therein to achieve the desired current output.

Current conversion circuit 47 in control loop 31 operates on the signals provided by sensor 32. The latter signals are representative of the 3-phase currents that actually flow in motor 12. Conversion circuit 47 is adapted to generate on its output a DC analog signal $i_{qs}$ which is representative of the torque component of the actual current flowing in motor 12. The operations performed by circuit 47 are substantially the same as those described with reference to driver 34, but in reverse order. Thus, the AC current signals generated by sensor 32 first undergo a 3:2-phase transformation and the rotating reference frame values are derived from stationary frame values. In similar manner, the other functions described with reference to driver 34 are carried out in reverse by circuit 47.

Figure 6:
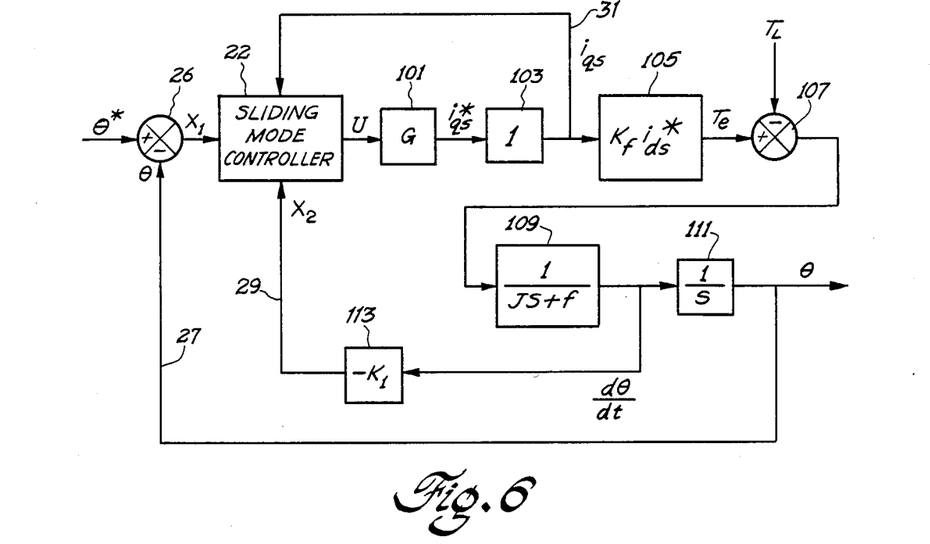
FIG. 6 is a transfer function diagram of the drive control system of the present invention.

FIG. 6 shows a transfer function diagram of motor 12 of FIG. 1 under the control of drive control system 10. The parameters $K_f$, $i_{qs}$, $i^*_{qs}$, U, $i^*_{ds}$, $X_1$, $X_2$, $\theta$, $\theta^*$, $K_1$, G, $d\theta/dt$ and $T_e$ are as previously defined. Further, $T_L$ is the torque applied to the motor shaft which opposes shaft movement, J is the rotational moment of inertia of the rotating mass, f is a friction factor and s is the Laplace variable. Block 101 represents the combined functions performed by amplifier means 50 and signal limiter 52 of FIG. 1. Block 103 represents the combined functions performed by inverter 20 and inverter driver 34 of FIG. 1. Block 105 represents the function by which motor 12 of FIG. 1 generates torque $T_e$. A summer 107 sums the effects of torques $T_e$ and $T_L$ on motor shaft 13, shown in FIG. 1, while block 109 represents a transfer function of the external load connected to shaft 13. Block 111 designates an integration operation by which the angular position of shaft 13 of FIG. 1 is derived from the shaft angular velocity. Block 113 represents the function performed by polarity reversing circuit 28 in FIG. 1.

With reference to FIG. 6, the following expression may be derived:

$$(T_e - T_L)\frac{K_1}{Js + f} = d\theta/dt$$

Analog signal $i^*_{qs}$ results from the amplification of the command signal U by amplifier gain constant G. Thus, $i^*_{qs} = GU.$ Upon substituting the above expression in the previously derived equation $$T_e = K_m i_{qs} \text{ when } i_{qs} = i^*_{qs},$$

$$T_e = K_m GU.$$

Using this expression for $T_e$ as well as for the earlier derived definition $X_2 = -d\theta/dt$, $$(K_m GU - T_L)\frac{K_1}{Js + f} = -X_2$$

which, upon rearranging, becomes $$J_s X_2 + f X_2 = -K_m K_1 GU + K_1 T_L.$$

Solving for $sX_2$ provides $$sX_2 = \frac{-fX_2}{J} - \frac{K_m K_1 GU}{J} + \frac{K_1 T_L}{J}.$$

Since $sX_2$ is the Laplace transformation of $dX_2/dt$ with zero initial condition, $dX_2/dt$ can be substituted for $sX_2$ upon taking the inverse transform. By defining the following constants $$b = f/J, \quad a = \frac{K_m K_1 G}{J} \text{ and } d = K_1/J,$$

and taking the inverse Laplace transform of $sX_2$, $$dX_2/dt = -bX_2 - aU + d\, T_L.$$

This last equation describes the time dependent performance of the induction motor system as a function of command signal U and is useful in the determination of U in a manner more fully described below.

As previously discussed, the forward motion sliding mode trajectory is represented by the three line segments shown in FIG. 5, defined as $S_1$, $S_2$ and $S_3$ and represented by corresponding equations. It is noted that the evaluation of a line segment equation for a system operating point located on a particular line segment results in $S_i = 0$, where $i = 1$, 2 or 3, depending on which line segment the system operation is currently following. For an operating point within the area bounded by the line segments, $S_i > 0$. For an operating point outside the bounded area, $S_i < 0$.

The sliding mode existence equation $$S_i dS_i/dt < 0$$

defines the system performance required to drive the system operating point toward the sliding mode trajectory. The derivation of this equation is found in the previously cited text by Itkis. By way of illustration, to determine the amplitude of command signal U, the sliding mode existence equation is applied to the constant velocity segment $S_2$, as defined by its equation $S_2 = X_2 - X_{20}$. The application to segments $S_1$ and $S_3$ is similar. By differentiating both sides of the equation of $S_2$, $$dS_2/dt = dX_2/dt.$$

Substituting this result in the sliding mode existence equation with $i = 2$, yields $$S_2 dX_2/dt < 0.$$

By substituting the previously derived expression for $dX_2/dt$, an inequality expression for the system sliding mode performance is provided in terms of the motor and shaft load parameters, as follows:

$$S_2(-bX_2 - aU + dT_L) < 0.$$

Next, U may be arbitrarily defined in terms of gain constants A and B and the actual system performance, as represented by the actual values of $X_1$ and $X_2$, that may be fed back to the sliding mode controller. Thus, $$U = AX_1 + B_2.$$

The values of A and B are chosen based on the signs of the products $S_2 X_1$ and $S_2 X_2$ respectively. In general $$A = +e_i \text{ if } S_i X_1 > 0$$

or $$A = -f_i \text{ if } S_i X_1 \geq 0$$

and $$B = +g_i \text{ if } S_i X_2 > 0$$

or $$B = -h_i \text{ if } S_i X_2 < 0$$

The terms e, f, g and h as used herein, are gain constants and in the present example $i = 2$. The derivation of these relationships governing the selection process for A and B is also found in the above cited Itkis text.

For the particular application, the gain constants are determined prior to regular system operation by computation and experimentation. The gain constants e, f, g, and h are then stored in the microcomputer memory for use during regular system operation. The definition of command signal U above may be combined with the previously described inequality expression for the system sliding mode performance to determine bounding values for the gain constants. Subsequent experience with the actual drive system permits further refinement of the gain constant values.

As previously discussed, a signal representative of the actual motor current torque component $i_{qs}$ is fed back to controller 22, shown in FIG. 1. Thus, this information becomes a part of the determination of the amplitude and polarity of command signal U. The equation for signal U then becomes $$U = AX_1 + BX_2 + CI_{qs}.$$

A value is chosen for gain constant C in a manner similar to that described above for the selection of values for gain constants A and B. Thus, the previous expressions for the values of A and B are supplemented by the relationships $$C = +j \text{ if } S_i i_{qs} > 0;$$

or $$C = -k \text{ if } S_i i_{qs} \geq 0.$$

The determination of the values j and k substantially follows the method described above.

In the preferred embodiment of the invention, a term with a predetermined constant D is additionally included in the definition of U for the deceleration segment of the trajectory. The magnitude of D is preselected to minimize steady state error in the control system due to gear backlash, coulomb friction and load torque effects. Constant D is essentially a dither component imposed on U to improve system control when the operating point is near the phase plane origin. The sign of the dither component is chosen on the basis of the sign of $S_3$, as defined above. The expression defining the dither component term is $$D \text{ Sgn } S_3$$

where $$\text{Sgn } S_3 = +1 \text{ if } S_3 > 0,$$

or $$\text{Sgn } S_3 = -1 \text{ if } S_3 < 0.$$

For the deceleration segment only, the definition of U, including the feedback of $i_{qs}$, is:

$$U = AX_1 + BX_2 + Ci_{qs} + D\text{Sgn } S_3$$

Figure 7:
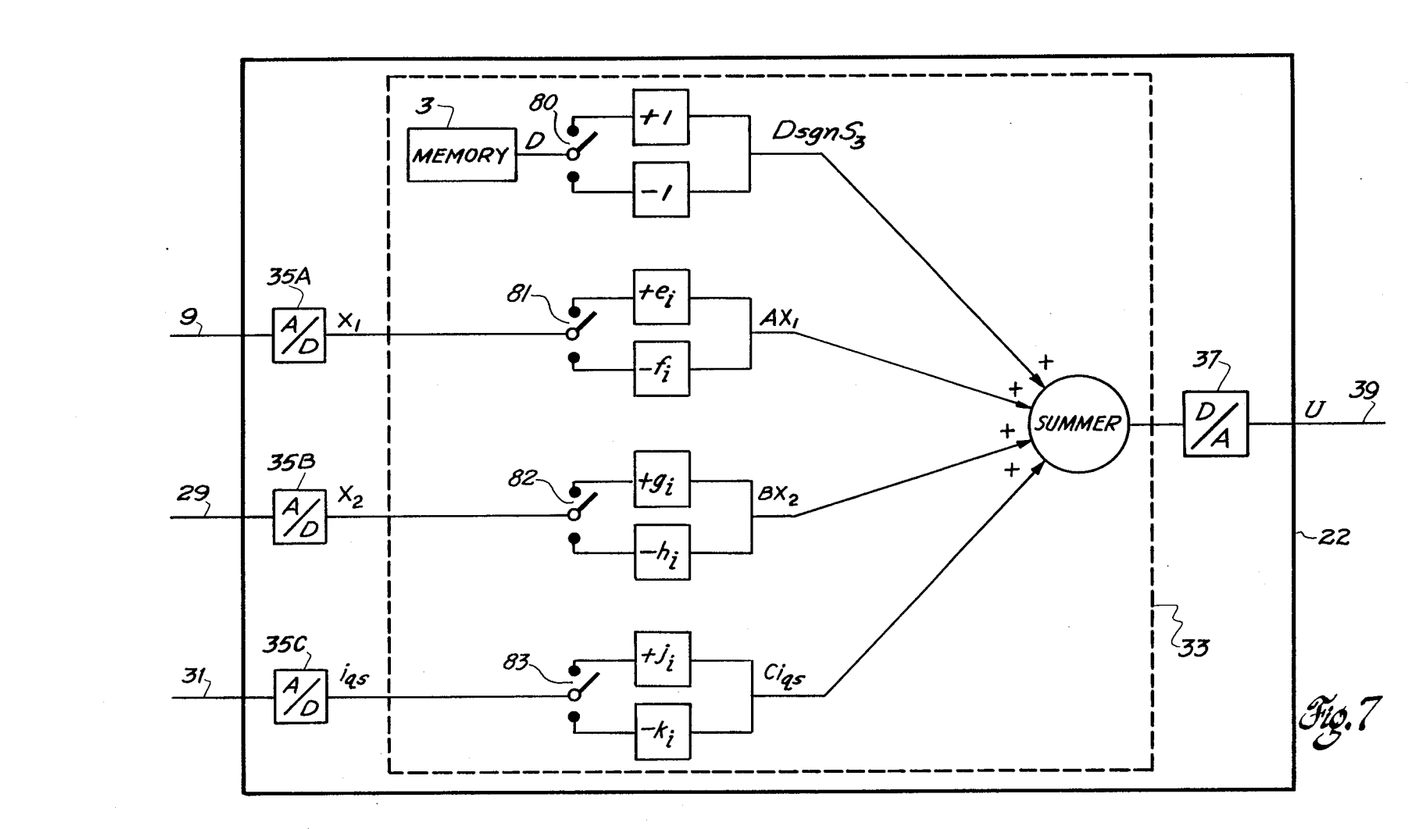
FIG. 7 illustrates the operation of the sliding mode controller in block diagram form.

FIG. 7 illustrates the procedure by which command signal U is determined within controller 22. Microcomputer 33 receives signals $X_1$, $X_2$ and $i_{qs}$ in digital form from analog-to-digital converters 35A, 35B and 35C, respectively. Each signal is respectively multiplied by a gain constant selected by the microcomputer in the manner previously described and shown functionally by switches 80–83. A memory 3 within the microcomputer is adapted to store the preprogrammed dither component D, the derivation of which was previously described. The dither component D is recalled from memory 3 and multiplied by either +1 or −1 as previously discussed. The products so determined are added together and the resulting sum is representative, in digital form, of the command signal U. The presence of converter 37 assures that signal U is applied in analog form to controller output 39.

In order to determine the value of U during operation, the sliding mode controller makes an initial determination as to whether forward or reverse motor shaft motion is required. This is determined by the sign of the initial position error $X_{10}$. If it is positive, forward shaft motion is required. If it is negative, then reverse shaft motion is required. The controller must also determine on which trajectory segment the motor is operating. The controller determines this by selecting the segment to which the instantaneous motor operating point, as defined in the phase plane, is closest.

Figure 8:
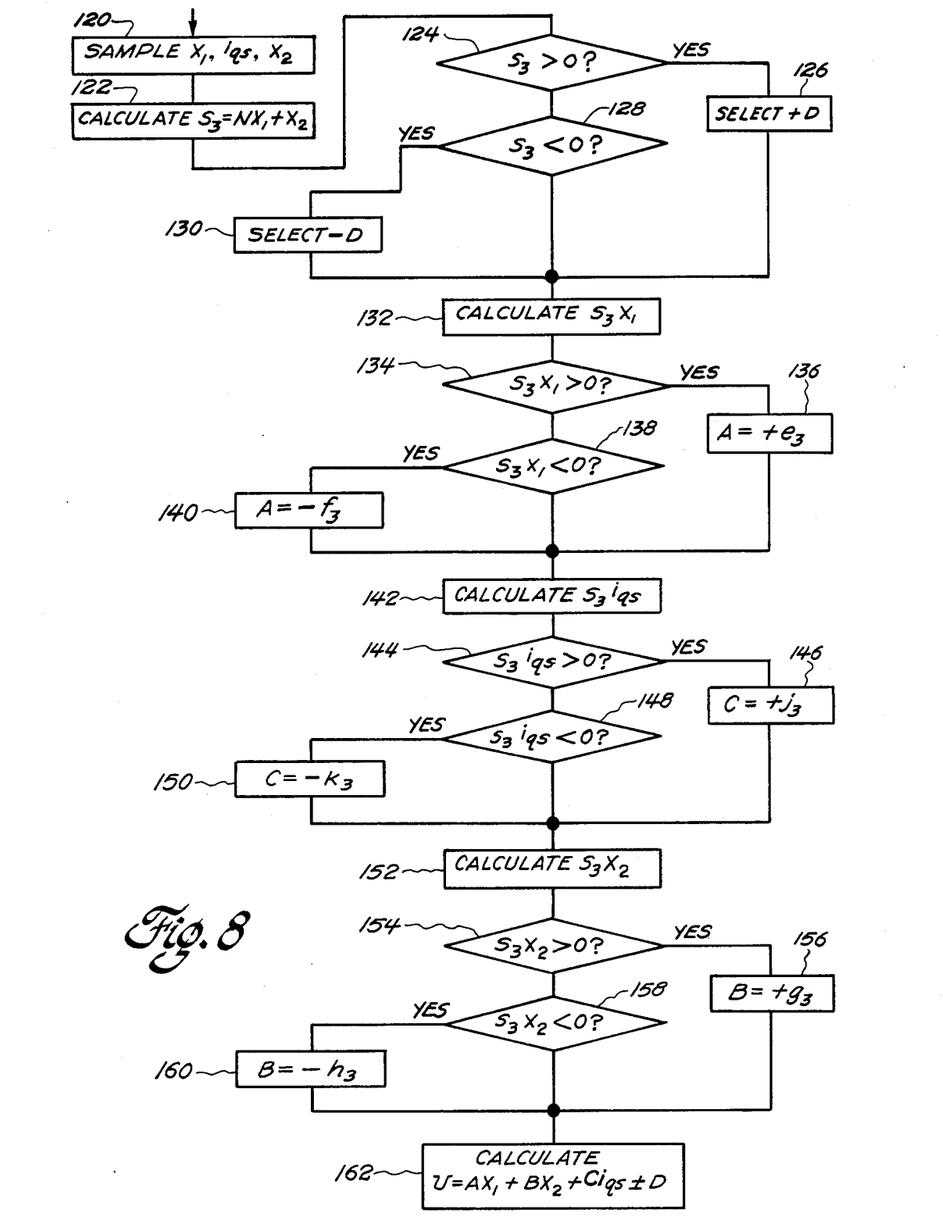
FIG. 8 is an exemplary flow chart of the algorithm executed by the sliding mode controller.

FIG. 8 illustrates the steps followed by controller 22 to determine the value of command signal U for the operation of motor 12, shown in FIG. 1, on the deceleration segment $S_3$ of the trajectory. While the steps followed to determine U for motor operation on segments $S_1$ and $S_2$ are similar to those performed for $S_3$, there is no dither component included. Further, the equations for $S_1$ and $S_2$ are different from that for $S_3$. Additionally a different group of predetermined gain constants is associated with each segment.

Referring to the flow chart of FIG. 8, the determination of U commences with the sensing of the instantaneous actual value of $X_1$, $X_2$ and $i_{qs}$ at step 120. The value of $S_3$ is calculated at step 122 using the instantaneous values of $X_1$ and $X_2$. Per steps 124 and 126, a positive dither component is selected if $S_3$ is greater than 0. In steps 128 and 130, a negative dither component is selected if $S_3$ is less than 0. Next, the product $S_3X_1$ is calculated in step 132. Steps 134 and 136 show that a gain constant A is assigned the value $+e_3$ if the product $S_3X_1$ is greater than 0.

In steps 138 and 140, gain constant A is assigned the value $-f_3$ if the product $S_3X_1$ is less than 0. Next, as shown by step 142, the product $S_3i_{qs}$ is calculated. Per steps 144 and 146, a gain constant C is assigned the value $+j_3$ if the product $S_3i_{qs}$ is greater than 0. In steps 148 and 150, a gain constant C is assigned the value $-k_3$ if the product $S_3i_{qs}$ is less than 0. Next, as shown by step 152, the product $S_3X_2$ is calculated. Per steps 154 and 156, gain constant B is assigned the value $+g_3$ if the product $S_3X_2$ is greater than 0. Per steps 158 and 160, gain constant B is assigned the value $-h_3$ if the product $S_3X_2$ is less than 0. Finally, step 162 shows that the command signal U is determined from the equation $$U = AX_1 + BX_2 + C\,i_{qs} + D.$$

The present invention lends itself to various modifications. Thus, while the preferred embodiment herein contemplates use of a 3-phase diode rectifier with a capacitor filter, it will be clear that other types of rectifiers are suitable and may be used. Also, instead of the position encoder which is optically coupled to the motor shaft, other devices may be used to generate a digital shaft position signal. Further, while separate transducers are shown for deriving shaft position and velocity analog signals from the digital signal provided by the position encoder, it will be clear that a tachometer and position transducer could be coupled directly to the shaft to respectively generate shaft velocity and shaft position signals directly.

The use of analog feedback signals and of analog control commands is preferred herein. However, the information represented by these signals could readily be encoded digitally and transmitted between components in digital form. In such an arrangement, digitial-to-analog conversion is required only where an analog function is to be performed.

While the preferred embodiment describes the application of the drive control system in a constant torque region of motor performance, with minor modifications the system may also be applied to control the operation of an induction motor in the constant power region shown in FIG. 3. In the constant power region, which corresponds to motor operation above rated speed $S_r$, the drive control system would not hold constant the value of the flux component of the current. The flux component is instead reduced in accordance with a predetermined functional relationship to motor speed. The control of the motor with respect to the sliding mode trajectory is, however, still accomplished by varying the torque component of current.

The preferred embodiment describes a sequence of steps followed by the controller to determine the value of command signal U. However, some changes in the sequence may be made without affecting the determination of U. For example, the sequence in which the values of the gain constants A, B and C are determined may be rearranged without affecting the determined value of U.

While the preferred embodiment illustrated and described herein comprises specific apparatus and method, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A drive control system for controlling an induction motor such that the position of the output shaft of said motor follows a predetermined trajectory defined by a coordinate plot of motor shaft position error against the first time derivative of said shaft position error;

said system comprising:
   summing means including a plurality of summing inputs, a first summing input being coupled to receive an externally derived signal representative of the desired angular shaft position of said motor;
   a first control loop coupled to apply a signal representative of the actual angular shaft position of said motor to a second summing input, said first control loop including shaft position transducer means adapted to provide said actual shaft position signal;
   said summing means being adapted to provide a signal on its output representative of said shaft position error;
   a sliding mode controller including a first input coupled to the output of said summing means;
   a second control loop coupled to a second input of said sliding mode controller for applying a signal representative of shaft error velocity, said shaft error velocity signal being representative of said first time derivative of said shaft position error;
   said second control loop including shaft velocity transducer means adapted to provide an output signal representative of the actual angular shaft velocity of said motor;
   said second loop further including a polarity reversing circuit coupled between said velocity transducer means and said second input of said sliding mode controller for providing said shaft error velocity signal to said second sliding mode controller input as a function of said shaft velocity signal;
   said sliding mode controller being adapted to provide an analog command signal on its output having an amplitude representative of the torque component of the instantaneous motor current required to maintain the operation of said motor on said predetermined trajectory; and
   an inverter coupled to said motor and responsive to said command signal to apply 3-phase AC current to said motor, whereby said motor is caused to conform said actual shaft position to said desired shaft position by operating along said predetermined trajectory.

2. The drive control system of claim 1 wherein said sliding mode controller includes:
   a microcomputer adapted to provide a digital output signal in response to the signals received at said controller inputs;
   means for converting said digital output signal to provide said analog command signal;
   separate portions of said trajectory plot being located in the second and fourth quadrants of the phase plane of said plot, said portions being indicative of motor shaft reverse and forward rotation, respectively;
   each of said trajectory portions comprising trajectory segments having either a positive slope, zero slope, or a negative sloping to impose an acceleration mode, a constant velocity mode, or a deceleration mode, respectively, on the operation of said motor;
   said microcomputer being responsive to the instantaneous values of said shaft position error signal and said shaft error velocity signal to select the appropriate trajectory segment for maintaining said motor operation on said trajectory and to select first and second gain constants from first and second predetermined groups of gain constants, respectively, for said selected trajectory segments, whereby the amplitude and polarity of said command signal are each a function of said selected gain constants; and
   said drive control system further including means in said microcomputer for providing a dither component of predetermined amplitude in said command signal whenever said motor is operating in said deceleration mode, said dither component being effective to minimize the steady state shaft position error during said deceleration mode.

3. The drive control system of claim 2 and further comprising:
   means for applying a signal representative of the torque component of said applied AC motor current to a third input of said sliding mode controller;
   said microcomputer being responsive to said last-recited torque component and said instantaneous values of said shaft position error and said error velocity to select a third gain constant from a third predetermined group of gain constants for said selected trajectory segment; and
   said microcomputer being adapted to provide said command signal in accordance with the equation:

$$U = AX_1 + BX_2 + CI + D$$

where:
U = amplitude of command signal;
A = first gain constant;
B = second gain constant;
$X_1$ = instantaneous value of shaft position error;
$X_2$ = instantaneous value of shaft error velocity;
C = third gain constant;
I = torque component of applied AC motor current; and
D = dither component.

4. A method of controlling the operation of an induction motor in accordance with a predetermined trajectory defined by a coordinate plot of motor shaft position error against the first time derivative of shaft position error, said method including the steps of:
   deriving a pair of signals representative of the actual position and the actual velocity, respectively, of the motor shaft;
   comparing said shaft position signal with an externally derived input signal representative of the desired shaft position of said motor to provide a signal representative of said shaft position error;
   deriving from said shaft velocity signal a shaft error velocity signal representative of said first time derivative of said shaft position error;
   generating an analog command signal as a function of said shaft position error and said shaft error velocity, said command signal having an amplitude representative of the torque component of the 3-phase AC current required to maintain the operation of said motor on said predetermined trajectory;

modifying said command signal as a function of a predetermined flux component of said required AC motor current to provide a 3-phase control signal; and generating a 3-phase AC current for application to said motor having an amplitude determined by said control signal;

separate portions of said trajectory plot being located in the second and fourth quadrants of the phase plane of said said plot, said portions being indicative of motor shaft reverse and forward rotation respectively, the trajectory portion in each quadrant comprising trajectory segments having either a positive slope, zero slope, or a negative slope so as to impose an acceleration mode, a constant velocity mode, or a deceleration mode respectively on the operation of said motor; and superimposing a dither component of predetermined amplitude on said command signal when said motor is operating in said deceleration mode, said dither component being adapted to minimize the steady state shaft position error during said deceleration mode.

5. The method of claim 4, and further comprising the steps of:

selecting, as a function of the instantaneous values of said shaft position error and said shaft error velocity, the appropriate trajectory segment for maintaining said motor operation on said trajectory; and selecting first and second gain constants from first and second predetermined groups of gain constants, respectively, for said selected trajectory segment;

whereby the amplitude and polarity of said command signal are each a function of said selected gain constants.

6. The method of claim 5 and further including the steps of:

deriving an analog signal representative of the torque component of the actual AC motor current;

selecting a third gain constant from a third predetermined group of gain constants for said selected trajectory segment as a function of said torque component and of said instantaneous values of said shaft position error and said shaft error velocity; and providing said command signal as an additional function of said torque component and said selected third gain constant such that:

$$U = AX_1 + BX_2 + CI + D$$

where:
U = amplitude of command signal;
A = first gain constant;
B = second gain constant;
$X_1$ = instantaneous value of shaft position error;
$X_2$ = instantaneous value of shaft error velocity;
C = third gain constant;
I = torque component of actual component; and
D = dither component.

* * * * *